United States Patent [19]

Ernst et al.

[11] 4,167,220
[45] Sep. 11, 1979

[54] SYSTEM FOR LUBRICATING THE BEARINGS OF CUTTING ROLLERS OF A ROLLER BIT

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Fed. Rep. of Germany

[21] Appl. No.: 873,134

[22] Filed: Jan. 27, 1978

[30] Foreign Application Priority Data

Jan. 29, 1977 [DE] Fed. Rep. of Germany ....... 2703724

[51] Int. Cl.² .............................................. E21B 9/35
[52] U.S. Cl. ................................... 175/337; 175/229; 175/339; 308/8.2
[58] Field of Search ................. 175/17, 227, 228, 229, 175/337, 339; 308/8.2

[56] References Cited

U.S. PATENT DOCUMENTS

| | | | |
|---|---|---|---|
| 1,010,143 | 11/1911 | Hughes | 175/354 X |
| 1,859,948 | 5/1932 | Zublin | 175/337 X |
| 1,918,902 | 7/1933 | Fletcher et al. | 175/337 |
| 3,244,459 | 4/1966 | Ortloff | 175/229 X |
| 3,659,663 | 5/1972 | Dysart | 175/337 X |
| 3,833,264 | 9/1974 | Elders | 299/86 |

FOREIGN PATENT DOCUMENTS 144800 4/1962 U.S.S.R. ................................... 175/337

*Primary Examiner*—Ernest R. Purser
*Assistant Examiner*—Nick A. Nichols, Jr.
*Attorney, Agent, or Firm*—Eugene E. Renz, Jr.

[57] ABSTRACT

A system for continuous lubrication of bearings in a drilling apparatus including a roller bit having at least one pivot and a cutting roller rotatably supported on the pivot by bearings. The system comprises pumping means in the form of spiral or oblique grooves on one of the spaced confronting faces of the roller bit and cutting roller and a flow opening or port arranged to effect flow of a flushing liquid through the bearing upon rotations of the cutting roller. The grooves may be selectively oriented to pump flushing liquid through the annular gap between the roller bit and cutting roller faces radially inwardly or radially outwardly for a given direction of rotation of the cutting roller.

9 Claims, 4 Drawing Figures

Fig. 2ᵃ

SYSTEM FOR LUBRICATING THE BEARINGS OF CUTTING ROLLERS OF A ROLLER BIT

BACKGROUND OF THE INVENTION

The present invention relates to drilling apparatus used, for example, in the recovery of petroleum. More specifically the invention relates to a novel system for lubricating the bearings of the cutting rollers of the roller bit in apparatus of this type.

These drilling apparatus typically comprise a plurality of hollow, rotatable tubes referred to as "the drilling string" which at their lower end mount a roller bit body having a number of pivots mounting cutting rollers supported on bearings so as to be freely rotatable about the pivot. The roller bit body usually is provided with nozzles which communicate with an axial passage in the drilling string to allow a supply of mud to be fed to the drilling area.

In the operation of the systems, the cutting elements engage the strata at the bottom of the bore hole to crush or comminute the rock and the mud supplied along the central passage of the drilling string issues out of the roller bit nozzles in the area of the bottom of the bore hole so that the particulate matter set free by the drilling head is washed away and taken along in the return stream of mud ascending through the annular space between the drilling string and the bore hole wall. These systems usually include means for supplying a flushing liquid in the environment surrounding the roller bit to lubricate the same. A system of this type is disclosed in U.S. Pat. No. 2,444,724 to R. W. Brown issued July 6, 1948 and entitled BEARING FOR ROCK BITS. In this arrangement the bearings located in the cutting roller on the side of the roller bearing come in contact with the flushing liquid. It has been observed, however, that this prior arrangement has certain disadvantages and drawbacks. For example, the mud formed during operation together with the abrasion material of the friction bearings or the fatigue scale particles of the roller bearings deposit on the surface of the bearings and there generate increased wear. This produces high operating friction with an unfavorably high operating temperature contributing to rapid bearing wear. Moreover, rapid wear causes large play in the bearing which adversely affects proper guidance of the cutting roller on the pivot of the roller bit. In summary, it has been observed that the service life of bearings lubricated by the prior art systems is accordingly very short.

It is an object of the present invention to provide an improved system for lubricating the bearings of cutting rollers of a roller bit wherein the deposit and accumulation of drilling mud or abrasive filings on the surfaces of the bearings is avoided and at the same time a cooling of the bearing is effected. A further object of the invention is also to provide a system which is comparatively simple in construction and economical to produce.

SUMMARY OF THE INVENTION

In accordance with the present invention, means is provided for pumping and circulating the flushing liquid through the bearings during relative rotation of the cutting rollers on their pivots. More specifically the system includes pumping means between the cutting roller and roller bit and at least one opening in the cutting roller located remote from the pumping means for outward or inward flow of the flushing fluid through the bearings. In the illustrated embodiment, means for pumping the flushing liquid to the bearings are generated by hydrodynamic grooves, for example, of oblique or spiral configuration formed in the inner axial end face of the cutting roller confronting and closely spaced to an opposing surface of the roller bit and the means for circulating flushing fluid drawn into or pumped out of the bearings by the grooves consists of openings or ports located at the end of the cutting roller opposite the inner axial end face.

Also in accordance with another feature of the present invention, the oblique or spiral grooves can be oriented in a manner to pump radially inwardly or radially outwardly and the orientation is selectively chosen in relation to the direction of rotation of the cutting roller or the roller bit.

A further feature of the present invention is that the port for circulating the flushing liquid through the bearings may be formed by boring a hole into the wall of the cutting roller. Alternatively the flow port for the flushing liquid may be formed by a channel in the roller bit communicating at one end with the environment and discharging at the pivot end into the cutting roller.

In accordance with the present invention, the drilling mud in the flushing liquid cannot therefore settle onto the bearing surfaces by reason of the fact that the bearing is constantly or continuously flushed and lubricated by the flushing liquid. The flushing liquid which flows outward through the port in the cutting roller or through the tight gap between the outer surface of the roller bit and the axial end face of the cutting roller provided with the oblique or spiral grooves carries all foreign particles that is, including drilling mud and abrasion filings generated in the bearing to the outside and at the same time affects the removal of friction heat generated in the highly stress bearings by way of convection of the flushing liquid.

BRIEF DESCRIPTION OF THE DRAWINGS

The design and mode of operation of a lubricating system in accordance with the present invention are hereinafter more fully set forth and described with reference to the accompanying drawings wherein.

Figures 1, 1A:
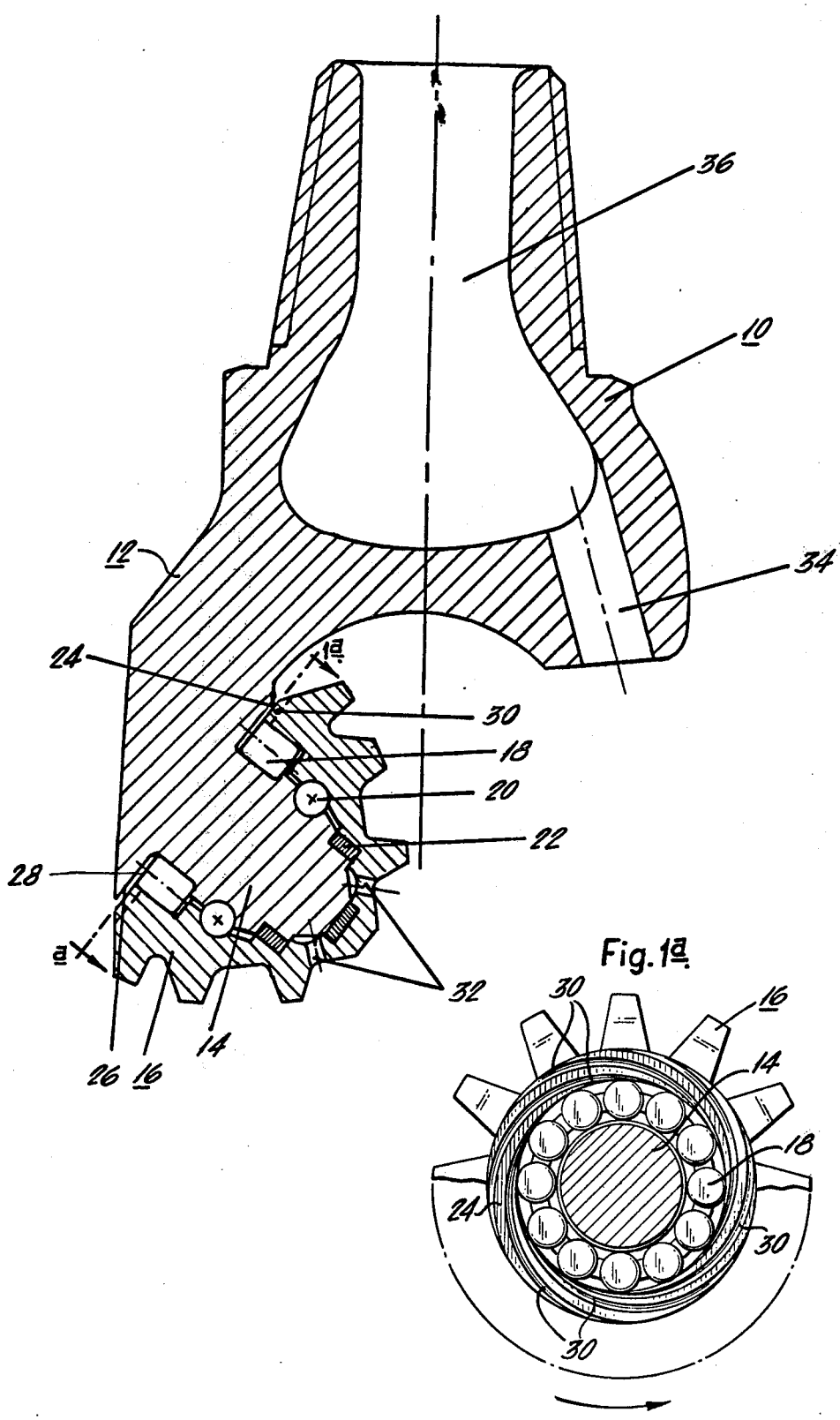
FIG. 1 is longitudinal section through a roller bit incorporating a lubricating system according to the present invention.
Figure 2:
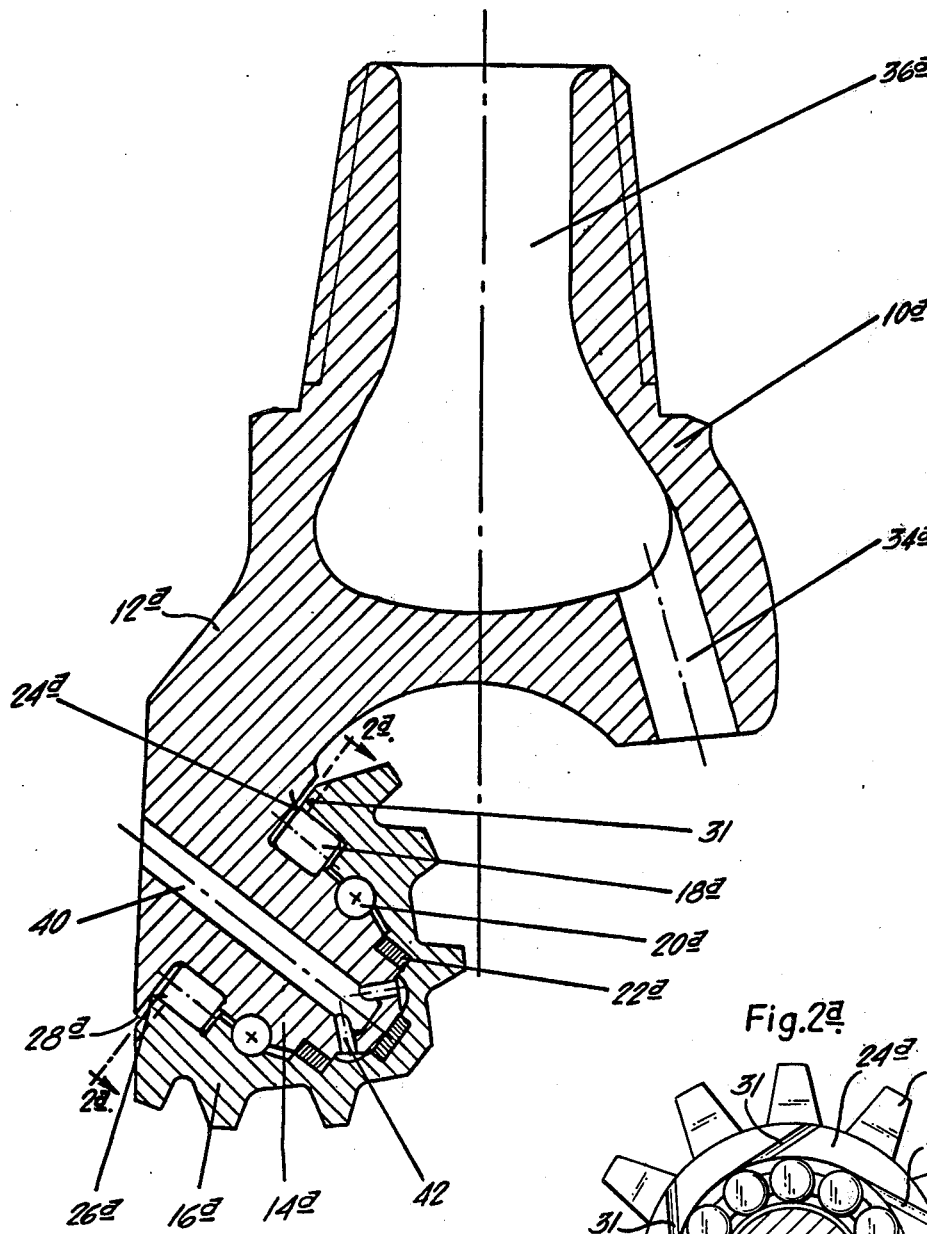
Figure 2:
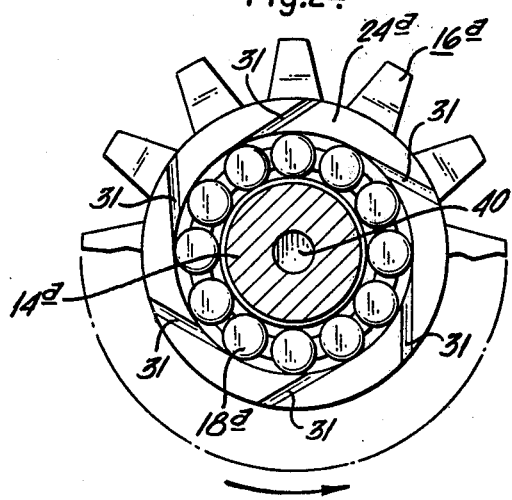

FIG. $1^a$ is a sectional view taken on lines $1^a$—$1^a$ of FIG. 1;

FIG. 2 is a similar longitudinal section through a roller bit having a modified port arrangement for effecting flow of the flushing liquid through the bearings of the roller bit; and FIG. $2^a$ is a sectional view taken on lines $2^a$—$2^a$ of FIG. 2.

DETAILED DESCRIPTION OF THE PREFERRED EMBODIMENTS

Referring now to the drawings and particularly to FIGS. 1 and $1^a$ thereof, there is illustrated a drilling head assembly incorporating a lubricating system in accordance with the present invention. The drilling head generally designated by the numeral 10 comprises a bit body 12 having one or more pivots 14 at its lower end. Each of the pivots 14 rotatably mounts a cutting roller 16. The pivot and internal surface of the cutting roller are provided with complementary raceway surfaces for a series of bearing supports including an outer roller bearing 18, a central ball bearing assembly 20 and an inner friction bearing 22. As illustrated, the outer axial end face 24 of the cutting roller lies generally parallel to and in confronting relation to an inwardly directed circumferentially extending face 26 of the pivot to provide a circumferentially extending annular gap or space 28 in fluid communication with the bearings as illustrated.

In accordance with the present invention, pumping means is provided for circulating a flushing liquid through the bearings. In the present instance the pumping means includes grooves 30 of a spiral configuration which are oriented in a predetermined manner relative to the direction of rotation of the cutting roller relative to the pivot so that grooves are operative to pump a flushing liquid from the environment inwardly through the annular space 28 to the bearings. The annular gap 28 between the axial end face 24 of the cutting roller and the annular face 26 of the pivot and the depth of the grooves 30 are of a comparatively small size so that only relatively small dirt or mud particles are allowed to pass and harmful larger particles are rejected. The annular gap 28 is preferably no greater than 1 mm and the depth of the grooves is preferably no greater than 0.5 mm. Even though the groove configuration is spiral it is to be understood that the present invention contemplates other groove arrangements, for example, a series of circumferentially spaced angularly oriented or oblique grooves which have the effect of pumping liquid into the bearings upon relative rotation of the cutting roller and pivot. In the present instance in order to effect circulation of the flushing liquid through the bearings, one or more flow ports in the form of bore holes 32 are formed in the tip of the cutting roller at the end thereof opposite the outer axial end face 24.

A flushing liquid may be supplied to the environment of the cutting rollers through a channel 34 in the roller bit which at its inner end communicates with a cavity 36 filled with a flushing liquid under pressure. This arrangement supplies in a well known fashion the environment of the roller bit with the flushing liquid.

Considering now the operation of the drilling head and assuming that the cutting rollers are rotating on the pivot in the direction indicated, the flushing liquid by reason of the pumping effect of the spiral grooves 30 flows successively through the roller bearing 18, the ball bearing 20 and the friction bearing 22 and is then returned to the outside environment through the flow ports 32 in the outer tip of the cutting roller. By this action the bearings are simultaneously lubricated and cooled upon flow of the flushing or rinsing fluid therethrough. Furthermore by reason of the continuous flow there is no accumulation of drilling mud which as noted above can be the cause of increased operating friction and greater wear.

There is illustrated in FIGS. 2 and $2^a$ a modified embodiment of a lubricating system in accordance with the present invention. The structural arrangement of the drilling head is generally the same as that described above and accordingly like reference numerals are applied with letter superscripts. Thus the drilling head includes a roller bit $12^a$ having a plurality of pivots $14^a$ which rotatably mount cutting rollers $16^a$ on a series of bearings $18^a$, $20^a$ and $22^a$. The inner end of the pivot is provided with the outwardly directed circumferentially extending shoulder $26^a$ which confronts and is spaced from the outer axial end face $24^a$ of the cutting roller to define a narrow flow channel or gap $28^a$ therebetween.

In this embodiment the outer axial end face $24^a$ of the cutting roller is provided with pumping means in the form of grooves 31 which in accordance with the present embodiment are oblique or diagonally oriented in relation to the direction or rotation of the cutting roller to pump flushing liquid radially outwardly. In accordance with this embodiment the flushing liquid is supplied to the bearings through a channel 40 running generally axially of the pivot, communicating at one end with the outside environment and at its inner end terminating in a pair of connecting ports 42 to the space adjacent the interior tip of the cutting roller. Accordingly the flushing liquid supplied to the environment of the cutting roller $16^a$ is drawn in through the channel 40 and is pumped into the bearing cavity between the cutting roller $16^a$ and the pivot $14^a$ via the connecting ports 42 which only allow relatively small dirt or mud particles to pass through. From there, the flushing liquid flows successively through the friction bearing $22^a$, the ball bearing $20^a$ and the roller bearing $18^a$ and finally flows back into the environment of the roller bit via the gap between the face $26^a$ and the face $24^a$, which is provided with oblique grooves 31.

When the respective directions of rotation of the roller bit and the cutting roller are reversed, the oblique grooves 31 pump radially inwardly. In this case the flushing liquid from the environment of the roller bit is pumped radially inwardly through the gap $28^a$ between the face of the shoulder $26^a$ and the axial end face $24^a$ of the cutting roller $16^a$ through the bearings and finally released back into the environment of the roller bit via the connecting ports or bore holes 42 and channel 40.

The gap $28^a$ is preferably no greater than 1 mm and the depth of the grooves 31 is preferably no greater than 0.5 mm.

In view of the above it is apparent that the present invention provides the advantage that none or very little dirt or abrasion can be deposited in the bearings of the cutting roller which would otherwise cause increased bearing wear and that the highly stressed bearings are cooled by the flushing fluid continuously flowing therethrough during the operation of the drilling head.

While particular embodiments of the present invention have been illustrated it is to be understood that changes and modifications may be made therein and it is intended that the following claims cover each variation and modification as falls within the true spirit and scope of the invention. For example, the oblique or spiral grooves may instead of being formed in the axial end face of the cutting roller be formed in the opposing confronting outer surface of the roller bit. Likewise the configuration of the grooves is not limited to the type shown but may involve other configurations producing a hydrodynamic pumping action to circulate the flushing liquid in the manner described.

We claim:

1. In a drilling apparatus including a bit body having at least one pivot and a cutting roller supported for rotation relative to the pivot and at least one bearing in an annular space between the cutting roller and pivot, the cutting roller and bit body having confronting faces defining an annular groove communicating with the annular bearing space, a system for lubricating the bearing with a flushing liquid comprising hydrodynamic pumping means including at least one groove on at least one of the confronting spaced faces of said cutting roller and bit body and at least one flow opening in the cutting roller communicating with the annular bearing space, said groove means being of a predetermined configuration so that upon rotation of said cutting roller in a predetermined direction, flushing liquid is pumped through the annular bearing space.

2. A drilling apparatus as claimed in claim 1 wherein said groove is formed in the face of said cutting roller.

3. a drilling apparatus as claimed in claim 1 wherein said flow opening is provided in said cutting roller remote from said face to effect circulation of flushing liquid through the bearing.

4. A drilling apparatus as claimed in claim 1 wherein said groove is oriented to pump flushing liquid radially inwardly from the environment to said annular bearing space upon relative rotation in said predetermined direction.

5. A drilling apparatus as claimed in claim 1 wherein said groove is oriented to pump flushing liquid radially outwardly from said annular bearing space to the environment upon relative rotation in said predetermined direction.

6. A drilling apparatus as claimed in claim 1 wherein the opening for the passage of the flushing liquid through the bearing is formed by a borehole formed in the wall of the cutting roller.

7. A drilling apparatus as claimed in claim 1 wherein said flow opening is formed by a channel in said pivot communicating at one end with the environment and at its opposite end with the interior tip of the cutting roller.

8. A drilling apparatus as claimed in claim 1 including a series of grooves about the periphery of said one face which are generally spiral configuration.

9. A drilling apparatus as claimed in claim 1 wherein the annular groove defined by the confronting faces of the cutting roller and drill bit is less than about 1 mm and the depth of said groove is less than about 0.5 mm.

* * * * *